Dec. 23, 1941.  J. F. D. SMITH  2,267,311
MEANS FOR SOUND-DEADENING WHEELS
Filed Oct. 12, 1939  2 Sheets-Sheet 1

INVENTOR:
John F. D. Smith
BY John P. Tarbox
ATTORNEY

INVENTOR:
John F. D. Smith
BY John P. Fairbox
ATTORNEY

Patented Dec. 23, 1941

2,267,311

UNITED STATES PATENT OFFICE 2,267,311

MEANS FOR SOUND-DEADENING WHEELS

John F. Downie Smith, Philadelphia, Pa., assignor to Edward G. Budd Manufacturing Company, Philadelphia, Pa., a corporation of Pennsylvania Application October 12, 1939, Serial No. 299,070

10 Claims. (Cl. 295—7)

This invention in general relates to the sound deadening of wheels, gears and the like, and more particularly to an improved method and means for dampening and muting the vibrations in rail car wheels during normal operation.

The principal object of the invention is to provide efficient sound-deadening means that may be conveniently and economically applied to conventional types of rail car wheels without material alteration thereof.

A specific object is to provide a comparatively light weight, but substantially rigid member, attachable to either side of a car wheel and adapted to minimize and restrain the natural period frequencies in the various portions of the wheel while moving along a track.

Another object is to provide a method and means of sound-deadening car wheels by the provision of a comparatively simple, light-weight member applicable to a car wheel and having a natural vibration frequency substantially differing from and opposed to the natural vibration frequency of the car wheel and its component parts.

A further object is the provision of a car wheel sound-deadener of the kind described, and of a type particularly adapted for quantity production and a wide field of commercial use.

With the foregoing and other objects in view, which will appear as the description proceeds, the invention resides in the method, in the combination and arrangement of parts and in the details of construction hereinafter described and claimed, it being understood that various changes in the precise embodiments of the invention, and in the several steps of the method employed, may be made within the scope of what is claimed without departing from the spirit of the invention.

This invention particularly contemplates the sound-deadening of wheels without material alteration thereto by the utilization of a method and means which differs, among other features, from prior devices designed for this purpose, by dampening the natural vibration frequencies of a wheel by the superposition of a light weight body of rigid material having a natural vibration frequency considerably lower than or different from that of the car wheel with a view to the practically instantaneous dampening or stoppage of the vibrations by the neutralization of the differing frequencies through their opposed phase relations. As is well known, the actual force required to dampen almost instantaneously sound vibrations in a body of the natural period of the body, even of considerable magnitude, is quite small, and it is by virtue of this fact that the comparatively light vibration dampener of rigid material of this invention is capable merely by its mechanical contact of effectively and quickly quenching the sound vibrations in a comparatively massive car wheel construction.

In practice, a car wheel sound deadener of the type herein described, for example, may have an actual weight of the order of 10 pounds as compared to a weight averaging between 600 and 700 pounds for a conventional rail car wheel.

Various devices, mostly employing plastic vibration-absorbing material, many of a cumbersome, complicated and comparatively costly construction and susceptible to comparatively early deterioration and damage, have been employed heretofore to minimize the objectionable noises emanating from the wheels of a fast-moving railway train. While some of these devices effected an appreciable reduction in the intensity of the sounds issuing from the vibrating car wheels, the disposition of the vibration-absorbing material thereto was such as to allow the rim portion of the wheel, for example, to vibrate independently of the web where the damping material has been customarily applied. By actual experimentation, I have discovered that it is possible to obtain a clear, bell-like note from the rim of a wheel, while the web and hub are completely muted by shock-absorbing material. This, of course, is primarily due to structural differences in the wheel and to the differences in the cross-sectional area and other dimensions of the web as compared to the rim or the hub, resulting in widely differing natural periods of vibration. To a lesser degree, the hub portion of the wheel is also capable of setting up sound vibrations which are minimized by the means herein described. One of the features of the invention therefore is the application of sound-deadening means of the character described not only to the web of the wheel, but also to the rim and hub portions.

In accordance with the above, the invention resides in a method and means for quenching or damping vibrations in a rail car wheel or the like by the application of a rigid body thereto, in contradistinction to the application of a plastic or non-vibratable medium; and furthermore in the extension of the vibration quenching body to and including the rim and hub portions to prevent their vibrating independently of the web of the wheel.

The invention also contemplates the utilization of a rigid body for quenching vibrations in a car wheel, and a suitable adhesive or bonding medium for retaining the rigid member upon the said wheel. The bonding material may be of appreciable thickness without vitiating the damping theory employed, but is not to be regarded per se as the means primarily affording the vibration-damping results herein described. Indeed the body of rigid material, as indicated above, may be retained in place at intervals if desired, and the extent of actual surface contact may be decidedly less than its entire area.

In the drawings wherein several preferred forms of the invention are depicted:

Figure 2:
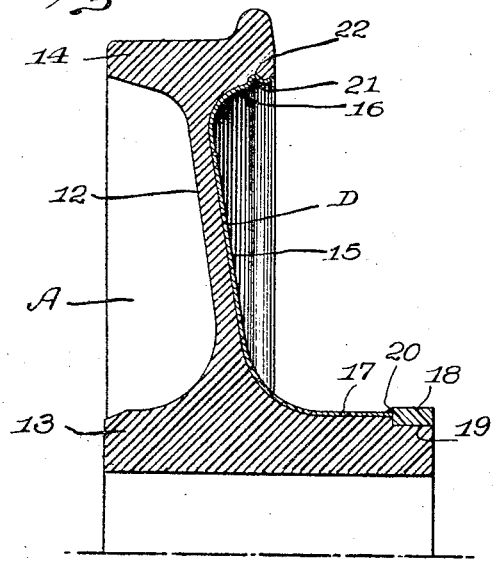
Figure 2 is a fragmentary sectional view taken on the line and as viewed in the direction of the arrows 2—2 of Figure 1.
Figure 3:
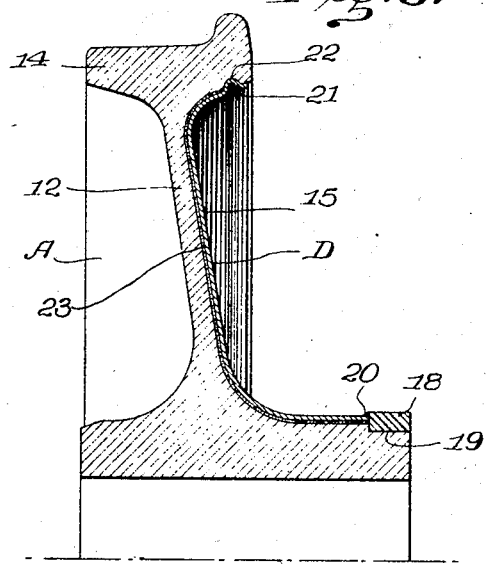
Figure 3 is a view similar to Figure 2 of a slightly modified form of the invention wherein the sound-deadening device is additionally secured to the wheel by an adhesive.
Figure 4:
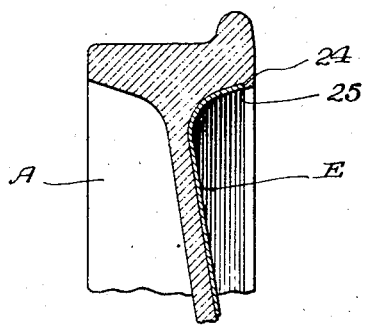
Figure 5:
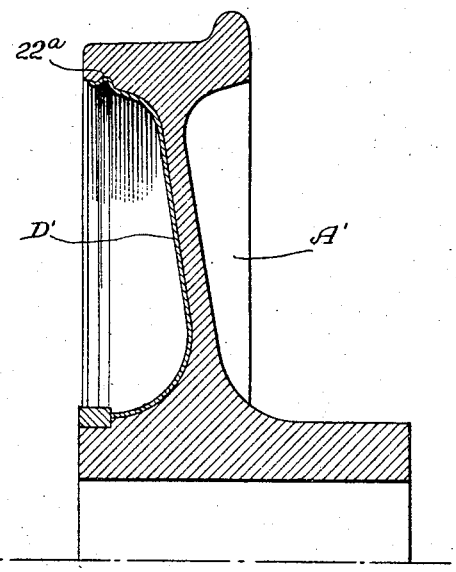
Figure 6:
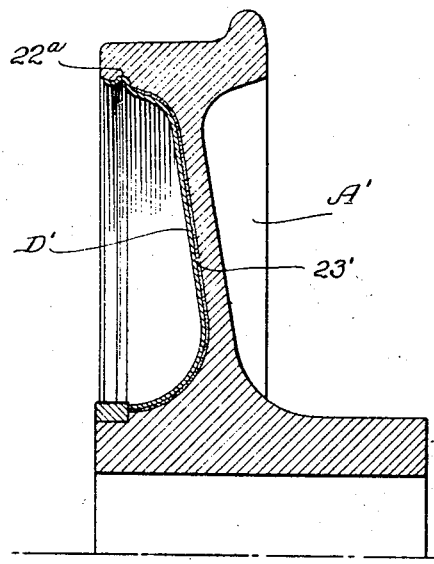
Figure 7:
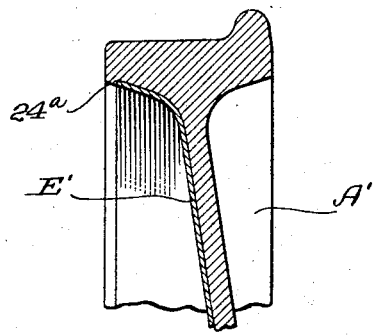

Figure 4 is a view similar to Figures 2 and 3 showing another modified form of the invention; and Figures 5, 6 and 7 are views similar to Figures 2, 3 and 4, but showing the sound-deadening device applied to the opposite face of the wheel.

Referring now to the drawings, the reference character A designates a car wheel, which as illustrated, may be of conventional type having a disc-like web 12 provided with an integrally formed hub 13 and rim 14.

In accordance with the invention, a sound-deadener or vibration-dampening member D preferably die-stamped from a sheet of rustless ferrous alloy or stainless steel and having the general configuration of the wheel to which it is to be attached, is fastened to either side of said car wheel, as described hereinafter. The sound-deadening member D, by virtue of the material employed, is substantially rigid, oxidation-proof, light in weight, resistant to crystallization, and has preferably a comparatively low natural period of vibration, as afforded by its form, cross-sectional dimensions and other physical characteristics. When struck, the member D emits a dull, muffled sound which is quickly quenched. This is in contradistinction to the fairly high-pitched, sustained, bell-like note emitted by a conventional type car wheel when set into vibration by a blow or during normal operation.

According to this invention, the natural period vibrations of a car wheel, such as that designated at A, are almost instantly damped by the vibrations of the juxtaposed sound-deadening member D, which latter by reason of its relatively different vibration frequencies and consequent opposed phase relations, serves to neutralize and quickly quench the vibrations in the various portions of the car wheel. The net result therefore is a substantially noiseless railway car wheel.

Figure 1:
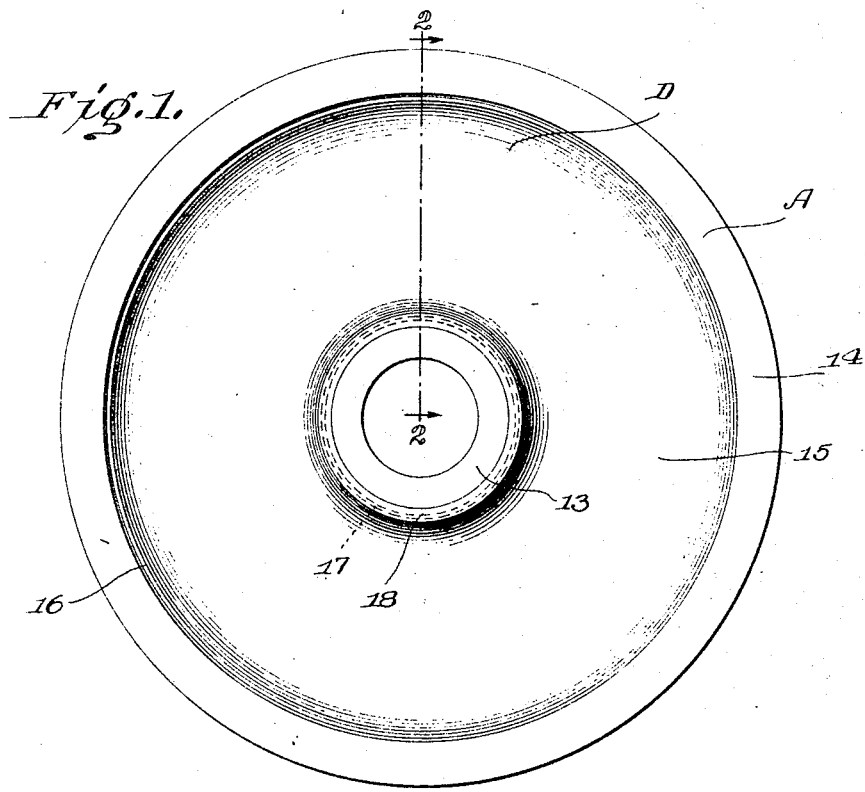
Figure 1 is a plan or face view of an embodiment of the sound-deadening device operatively applied to a conventional type of rail car wheel.

In practice, a preferred means for assuring the retention on the sound deadener D to the wheel is shown in Figs. 1 and 2 wherein the web rim and hub portions of the sound-deadening member D is of the same general configuration as the corresponding web, rim and hub portions of the wheel and consequently adapted to snugly fit thereagainst. The said member D, which as remarked above, is substantially rigid, although light in weight, includes a web 15 having an integrally formed hub 16 and a rim 17. A collar 18 shrunk on a reduced portion 19 of the wheel hub 13 and having its edge suitably bonded or welded, as at 20, to the adjacent edge of the hub 16 of the sound-deadener, serves to permanently secure the latter in the position illustrated.

The rim 17 of the sound-deadener which, as mentioned above, is configured to the shape of the rim portion 11 of the wheel, is provided with an annular lip 21 which seats in a corresponding annular recess 22 provided in the wheel rim 11. The sound-deadener D in the instant form may be conveniently applied to or spun against the wheel A by means of a roller (not shown) having a bead or lip adapted for forcing the lip 21 into the annular recess 22 of the wheel rim. Neither adhesive nor plastic damping material is employed in this form of the invention, the member D alone, performing its functions, as above described without the intermediary of other material or means.

The extension of the sound-deadener D to embrace a substantial portion of the hub and rim portions of the wheel, as clearly shown in Figure 2 and in the figures disclosing modified forms of the invention, is particularly contemplated by this invention with a view to quenching vibrations in the said rim and hub portions of the wheel occurring independently of its web. In this form of the invention, as illustrated in Figs. 1 and 2, I have found it preferable merely to engage the several surfaces of the hub, web and rim portions of the wheel by the sound-deadener, rather than weld or fasten one to another, as by screws, since in the latter cases, there is a tendency for the welded portions or screw holes in the wheel to set up local stresses and strains considerably shortening the life of the wheel and causing it frequently to fracture or crack at an early period of use.

In Figure 3, a slightly modified form of the invention is shown which differs from the form shown in Figures 1 and 2 only by the addition of a thin layer of an adhesive 23 interposed between the sound-deadening member D and the car wheel. The adhesive 23, by reason of the high temperatures generated immediately adjacent the tread and rim portions of the wheel A, particularly in cars where the brakes are applied directly to the rim of the wheel, must be highly resistant to heat and in this connection I have found certain cements capable of maintaining their adhesive characteristics without breakdown at temperatures encountered in actual rail car operation. The adhesive 23 does not materially alter the sound-deadening characteristics of the rigid member D, but may be used, if desired, to further assure the prevention of local movement of the device relatively to the wheel, which might occur in certain cases as a result of violent forced oscillation of the wheel over a railway track.

In this connection, it may be pointed out the majority of ordinary adhesives and plastic materials are unsuited for use in connection with the damping of vibrations in rail car wheels by reason of the heat generated in the latter. In practice, these adhesives and plastic materials either disintegrated by the evaporation of their volatile content, or liquefied during use which resulted in the radial shifting of their material to outer portions of the wheel during operation, or the actual loss of same from the wheel.

In Fig. 4, another modification is shown wherein the rim portion of the car wheel is provided with an annular shoulder, as at 24, which serves as an abutment for the extremity of the rim portion 25 of the modified sound-deadener E which in this form has no groove-engaging lip or bead, as shown in the form illustrated in Figs. 1, 2 and 3. An adhesive 23', preferably of the type described above, may be interposed between the wheel and member E, if desired, for the same considerations mentioned with respect to Fig. 3.

The embodiments shown in Figures 5, 6, and 7 are substantially similar to those shown in Figs. 2, 3, and 4 respectively except that in the first mentioned group of figures, the deadening device, therein designated D' (Figs. 5, 6) and E' (Fig. 7) has been applied to the face of the wheel opposite to that shown in Figures 2, 3, and 4. The only changes required are the transfer of the shoulders 22 and 24 of the car wheel A from the outside to the inner side of the wheel here designated A' as denoted by the numerals 22ª and 24ª in Figs. 5, 6, and 7. A slight change is made in the curve of the modified sound-deadening device D', to conform to the corresponding slight difference in contour of the inner face of the car wheel A'. Otherwise, the shape and functioning of the member D' are substantially the same as the member D described above.

It is to be understood that the invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention; and it will be further understood that each and every novel feature and combination present in or possessed by the mechanism herein disclosed, forms a part of the invention included in the application.

What I claim is:

1. In a wheel such as a railway vehicle wheel of the type having a radially extending comparatively thick walled annular portion, which portion is liable to produce or amplify vibrations; an annular comparatively thin walled member of substantially rigid material, said member having one of its surfaces coextensive with and conforming in its shape to a wide, annular part of one of the flanks of said annular wheel portion; means for holding said surface of said member against said flank of said wheel portion thereby dampening the vibrations of the latter.

2. In a wheel such as a railway vehicle wheel of the type comprising a comparatively thick walled, generally radially extending disc portion and a second adjoining thick walled generally axially extending cylindrical portion, which portions are prone to produce or amplify vibrations; an annular comparatively thin walled, dish-formed member of substantially rigid material, said member having one of its surfaces coextensive with and shaped to conform with at least a considerable annular part of one of the side surfaces of said adjoining wheel portions; means for holding said surface of said member against said surface part of said wheel portions thereby dampening vibrations of the latter.

3. In a wheel such as a railway vehicle wheel of the type comprising a comparatively thick walled annular, generally radially extending disc portion and integral therewith, thick walled, generally axially extending hub and rim portions, which disc, hub and rim portions are prone to produce or amplify vibrations; an annular comparatively thin walled, substantially rigid, dish-formed member having one of its surfaces coextensive with and shaped conforming to at least a considerable annular part of one of the side surfaces presented by said three wheel portions; means for holding said surface of said member against said surface part of said wheel portions thereby dampening vibrations of the latter.

4. In a wheel such as a railway vehicle wheel of the type having a comparatively thick walled, generally radially extending annular portion, which portion is liable to produce or amplify vibrations; an annular comparatively thin walled member of substantially rigid material, said member having one of its surfaces coextensive with and substantially conforming to at least a wide annular part of one of the side surfaces of said annular wheel portion; means for holding said surface of said member against said surface part of said wheel portion thereby dampening the vibrations of the latter, and a thin layer of sound dampening material between said opposing surfaces for further improving the sound deadening effect.

5. In a wheel such as a railway vehicle wheel of the type having a generally radially extending comparatively thick walled annular portion, which portion is liable to produce or amplify vibrations; a comparatively thin walled annular member of substantially rigid material, said member having one of its surfaces coextensive with and conforming substantially to a comparatively wide annular part of one of the side surfaces of said annular wheel portion; means for holding said surface of said member against said surface part of said wheel portion thereby dampening the vibrations of the latter, said means comprising an adhesive between said opposing surfaces.

6. In a wheel such as a railway vehicle wheel of the type comprising a comparatively thick walled, generally radially extending disc portion and an adjoining, generally cylindrical thick walled portion projecting in axial direction beyond said disc portion, said portions being prone to produce or amplify vibrations; an annular comparatively thin walled, dish-formed member of substantially rigid material, said member having one of its surfaces coextensive with and shaped to conform to at least a considerable part of one of the side surfaces of said adjoining wheel portions; means for holding said surface of said member against said surface part of said wheel portions so as to dampen vibrations of the latter, said means comprising interengaging parts formed on said cylindrical wheel portion and on that part of said member which covers its one surface.

7. In a wheel such as a railway vehicle wheel of the type comprising a comparatively thick walled, generally radially extending disc portion and an adjoining, generally cylindrical thick walled portion projecting in axial direction beyond said disc portion, said portions being prone to produce or amplify vibrations; a comparatively thin walled, dish-formed member of substantially rigid material, said member having one of its surfaces coextensive with and shaped to conform to at least a considerable part of one of the side surfaces of said adjoining wheel portions; means for holding said surface of said member against said surface of said wheel portions so as to dampen vibrations of the latter, said means comprising a radially extending projection on the surface of said cylindrical wheel portion being spaced from the adjoining part of the surface of the disc portion, and a marginal portion of said member being adapted to be forcibly snapped behind and consequently retained by said projection.

8. In a wheel such a railway vehicle wheel of the type comprising a comparatively thick walled, generally radially extending disc portion and an adjoining, generally cylindrical thick walled portion axially projecting beyond said disc portion, said portions being prone to produce or amplify vibrations; a comparatively thin walled, dish-formed member of substantially rigid material, said member having one of its surfaces coextensive with and shaped to conform to at least a considerable part of one of the side surfaces of said adjoining wheel portions; means for holding said surface of said member against said surface of said wheel portions so as to dampen vibrations of the latter, said means comprising a radial groove in the surface of said cylindrical wheel portion which is spaced from the adjoining part of the surface of said disc portion, and a radially extending projection being formed on said member and being adapted to engage said groove.

9. In a wheel such as a railway vehicle wheel of the type comprising a comparatively thick walled annular, generally radially extending disc portion and integral therewith, thick walled hub and rim portions, said hub and rim portions projecting in axial direction beyond the adjoining part of said disc portion; said disc, hub and rim portions being prone to produce or amplify vibrations; an annular comparatively thin walled, substantially rigid, dish-formed member having one of its surfaces coextensive with and shaped conforming to at least a considerable annular part of one of the side surfaces presented by said three wheel portions; means for holding said surface of said member against said surface of said wheel portions thereby dampening vibrations of the latter, said means consisting substantially of radially offset portions on the surfaces of said hub and rim portions and marginal formations on said member adapted to be forcibly engaged by said offset portions.

10. As an article of manufacture, an annular dish-shaped, comparatively thin walled member of substantially rigid material, the surface of which member is coextensive with and corresponds substantially to at least a part of one lateral surface of a wheel comprising a generally radially extending disc portion and adjoining axially extending hub and rim portions and which is adapted to be held against said surface part of said wheel portions so as to act as a vibration absorber.

JOHN F. DOWNIE SMITH.